Patented Feb. 29, 1944

2,343,205

UNITED STATES PATENT OFFICE 2,343,205

PROCESS OF FORMING SYNTHETIC RESIN BUSHINGS

Richard Pudelko, Zug, Switzerland, assignor to Landis & Gyr, A-G., a body corporate of Switzerland Application May 15, 1941, Serial No. 393,510
In Switzerland June 7, 1940

2 Claims. (Cl. 18—55)

The present invention relates to a novel and improved process of forming bushings of synthetic material, as well as to a novel and improved bushing.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel part, constructions, arrangements, combinations and improvements herein shown and described.

The accompanying drawing, referred to herein and constituting a part hereof, illustrates one embodiment of the invention, and together with the description, serve to explain the principles of the invention.

Recently artificial material, for example synthetic resins, have been used for making bearings but the use of such a substance for a one-piece bearing or bushing, used especially for small apparatus, has encountered difficulties. In view of the small forces dealt with such bearings are very sensitive to friction, and excessive friction may occur very easily if the bore of the bushing is cylindrical, as is usual. If the axes of the bore of the bushing and the shaft do not coincide accurately, that is to say if a canting of the shaft in the bore occurs, the shaft rubs against the edges of the bore of the bushing, and resistance to rotation is increased thereby, and the oil holding capacity of the bearing is diminished, because in that case the oil film between the bore of the bushing and the shaft can extend over only a portion of the bearing faces. The oil is then pulled to and fro in the bearing from one point near the side or edge of the bearing to a point near the other edge of the bearing and diametrically opposite the first point.

In such bushings it would be desirable to give their bore a convex curve, and where the axes of the bore of the bushing and of the shaft deviate somewhat from each other, that is to say, where the shaft occupied a slightly oblique position in the bore of the bushing, such curvature would prevent binding and thereby lessen the friction in the bearing. At the same time a better oil holding efficiency would be obtained as the oil film would extend all around uniformly over both sides of the contact faces in the bearing.

The usual manner of making pressed or injected parts of artificial material will, however, not allow the production of such convexly curved bushings, due to the necessity of parting the core of the mold. The parting line of the core would occur exactly at the narrowest point of the bore of the bushing, which would create a flash or ridge in the bushing at the running part of the shaft in the bushing. Therefore, the bushing would be bad exactly at the point where quality is most important, and it would thus be practically useless.

The present invention has for its object the provision of a novel and improved process of producing a bushing of artificial material which eliminates the difficulty described, as well as a novel and improved bushing of such material which consists of one piece and insures operation without danger of an additional friction moment and has good oil retention.

According to the process of the present invention a metallic core with a concave curve is inserted in the mold of the bushing, and removed from the bore of the bushing by pulling it apart after the bushing has been made and the mold disassembled. This method thus produces a bushing of artificial material consisting of one piece with a convexly curved core.

It will be understood that the foregoing general description and the following detailed description as well are exemplary and explanatory of the invention but are not restrictive thereof.

The drawing diagrammatically illustrates the process and shows a bushing produced according to said process.

Figure 1:
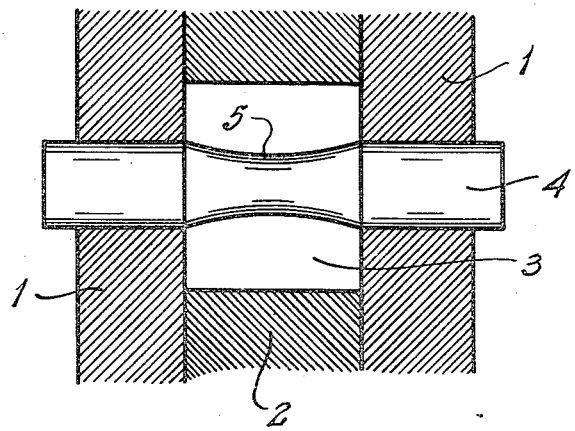
Fig. 1 is a cross section of a mold for forming a bushing.
Figure 2:
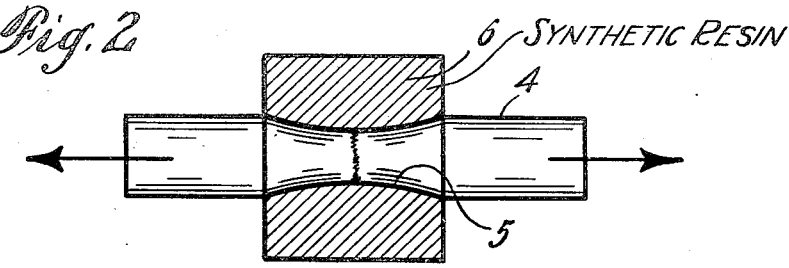
Fig. 2 shows in section the bushing produced, together with the core member of the mold.

Referring now in detail to the accompanying drawing illustrating the preferred manner of carrying out the present invention, Fig. 1 shows a metallic mold built up of plate-shaped side members 1, an annular member 2 between them and a core 4 passing through the members 1 and the cavity 3 of the mold. The core 4, which may be made of brass or steel, is turned and polished to form a concave curve at 5, i. e., where it passes through the cavity 3 of the mold. Such a curve forms a narrowed zone of less diameter and consequently of less strength, than the other portions of the core, which weakened zone is usually at the middle of the core, as shown in Figs. 1 and 2.

Through an opening not shown in the drawing, artificial material such as synthetic resin is injected into said mold. When the mold is taken apart after the material has hardened, the work piece 6 representing a bushing made of the material is fixed on the core 4, as it closely adjoins the latter in the concave curved portion 5 of the core, thereby preventing the stripping of the bushing from the core. The core 4 is then fixed at both ends in a tension machine and stretched until pulled apart in the same manner as for a test of tensile strength. It breaks at the thinnest part, thus freeing the convex bore 7 of the bushing 6.

Figure 3:
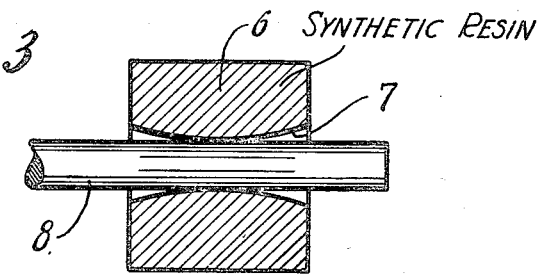
Fig. 3 shows in section the bushing with a shaft supported by it.

As will be seen from Fig. 3, the bushing 6 thus produced offers a highly useful bearing for the shaft 8 in it, as even a slightly oblique position of shaft 8 in the bushing bore 7 does not produce any binding effect or any noticeably harder running of the shaft 8, and as good oiling action is obtained by the formation of a film which in addition extends uniformly over both sides of the contact faces between bushing and shaft.

Instead of producing the bushing by means of injection as in the example described, it may also be produced by the pressing process.

The invention in its broader aspects is not limited to the specific mechanisms shown and described but departures may be made therefrom within the scope of the accompanying claims without departing from the principles of the invention and without sacrificing its chief advantages.

What I claim is:

1. The method of forming molded bushings having a bore of convex curvature, which comprises forming a core of concave curvature, for providing a narrowed zone of less diameter and less strength than other portions of the core, molding sythetic resin around said core, and pulling said core endwise to cause it to break at said narrowed zone.

2. The method of forming a one-piece bearing of synthetic resin and having a convex curvature, comprising the steps of molding the synthetic resin around a concavely curved core, the diameter of which varies to provide, at about the middle thereof, a zone of least diameter, and pulling said core endwise to cause it to break at said zone of least diameter.

RICHARD PUDELKO.